Nov. 6, 1956   F. J. BRAUNEIS   2,769,466
LATHE ATTACHMENT
Filed July 8, 1954   4 Sheets-Sheet 1

Frank J. Brauneis
INVENTOR.

BY
Attorneys

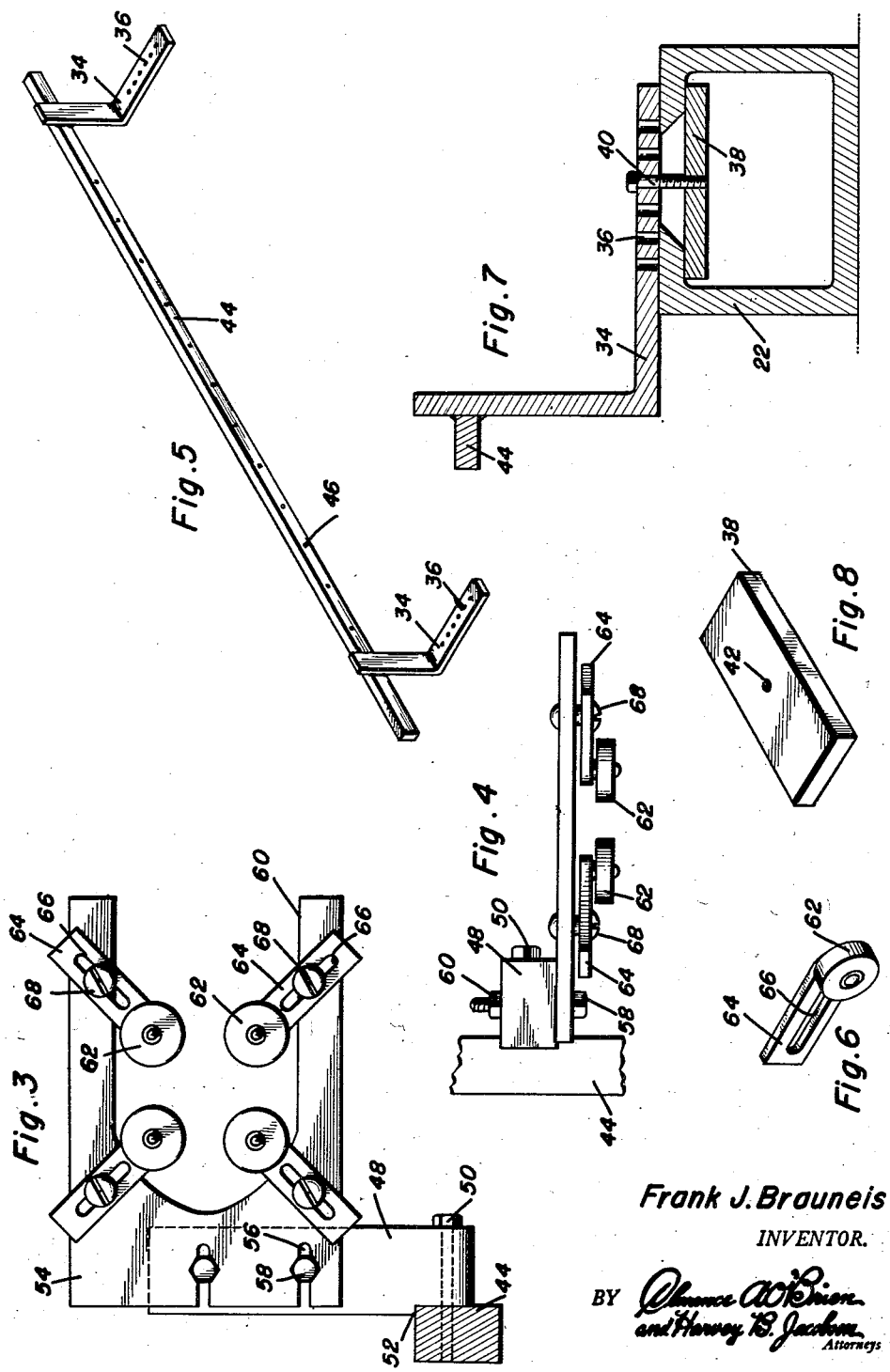

Nov. 6, 1956 F. J. BRAUNEIS 2,769,466
LATHE ATTACHMENT
Filed July 8, 1954 4 Sheets-Sheet 3
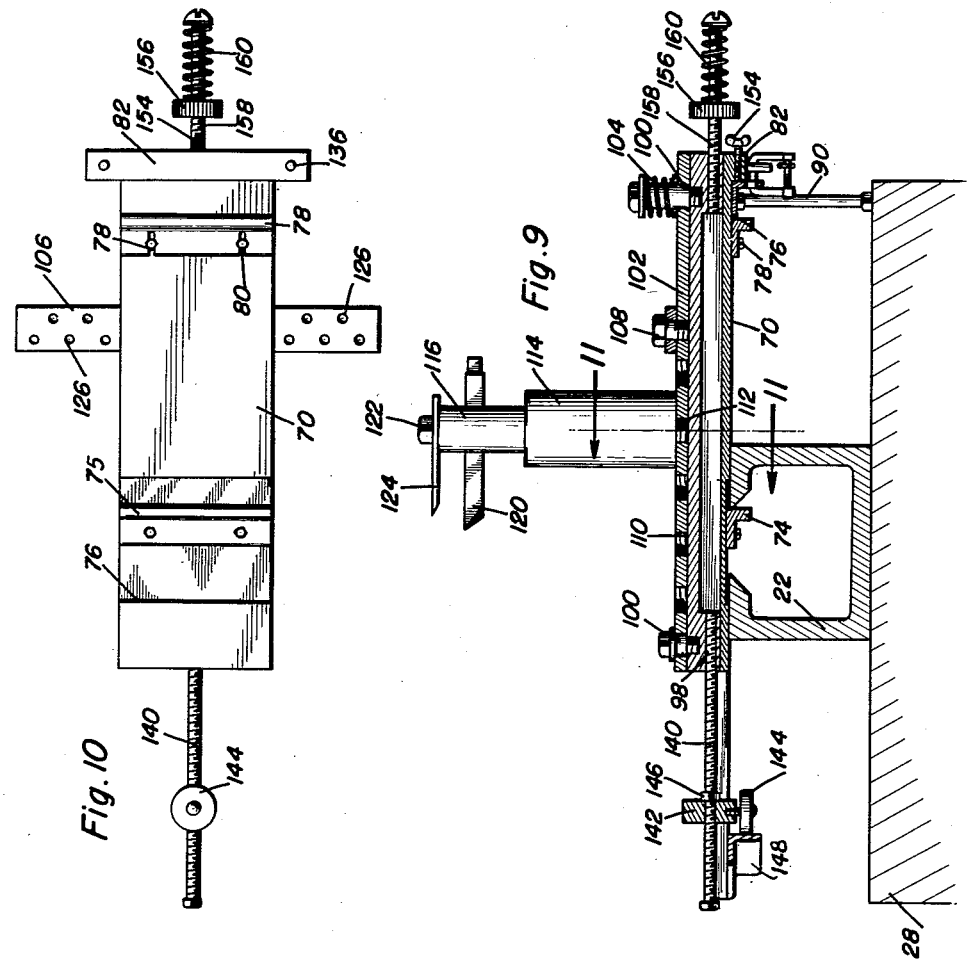
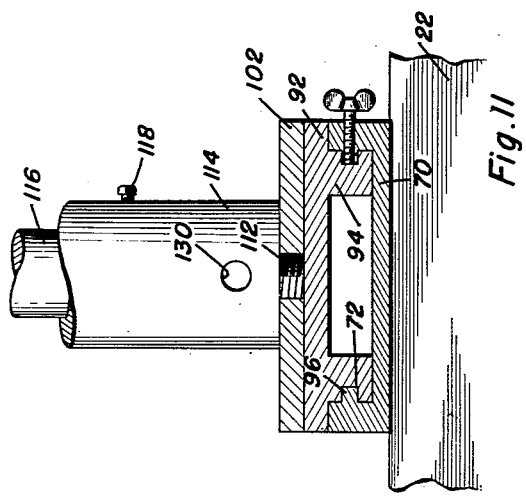
Frank J. Brauneis
INVENTOR.

Nov. 6, 1956  F. J. BRAUNEIS  2,769,466
LATHE ATTACHMENT
Filed July 8, 1954  4 Sheets-Sheet 4

Frank J. Brauneis
INVENTOR.

BY *Clarence A. O'Brien*
*and Harvey B. Jacobson*
Attorneys

United States Patent Office 2,769,466
Patented Nov. 6, 1956

2,769,466

LATHE ATTACHMENT

Frank J. Brauneis, West Camp, N. Y.

Application July 8, 1954, Serial No. 442,030

6 Claims. (Cl. 142—7)

This invention relates to lathe attachments, and more specifically provides a device for attachment to a wood lathe for turning out accurate work on a wood lathe.

An object of this invention is to provide a lathe attachment for a wood lathe which is simple in construction, easy to use, easy to assemble and disassemble, versatile in utility, well adapted for its intended purposes, and relatively inexpensive to manufacture.

Another object of this invention is to provide a lathe attachment including a longitudinally and laterally adjustable tool supporting post mounted on a carrier having a swing plate wherein the carrier is transversely adjustable on a base that is longitudinally movable on the lathe ways, thereby providing longitudinal, transverse and arcuate movement of the tool for cutting and forming work of various shapes in an accurate manner on a wood lathe.

A further object of the present invention is to provide a lathe attachment for a wood lathe including a central support for the work wherein the work is supported between its ends, thereby preventing any tendency for the work to give under pressure exerted by the cutting tool wherein the work support is adaptable for various positions and various sizes of work.

A still further object of this invention is to provide a lathe attachment having various adjustments which may be set and several pieces of work may be cut, using the same shape and details of construction.

Still another important object of the present invention is to provide a lathe attachment which may be utilized with a pattern or template for cutting work of the same shape as the pattern or template wherein the transverse movement of the tool is controlled by a follower positioned on the transversely sliding carrier that supports the tool, thereby guiding the movement of the tool and controlling the cutting of the work positioned in the lathe.

Yet another important object of the present invention is to provide a lathe attachment having an arcuately swinging plate that may be pivoted at either end with the tool post and tool longitudinally adjustable thereon wherein the tool may be moved in an arcuate manner for cutting a concave or convex surface of varying radii.

A still further important feature of the present invention is to provide a lathe attachment for a wood lathe wherein a taper rail is adjustably secured in spaced relation to the lathe ways wherein a follower engages the taper rail for cutting a piece of work in a predetermined tapered condition.

These together with other objects and advantages which will become subsequently apparent reside in the details of construction and operation as more fully hereinafter described, reference being had to the accompanying drawings forming a part hereof, wherein like numerals refer to like parts throughout, and in which:

Figure 3 is a detailed section taken substantially along section line 3—3 of Figure 2, showing the details of construction of the work supporting means;

Figure 4 is a top plan view of the construction of Figure 3;

Figure 5 is a perspective view showing the attaching rail for the work supporting means of Figure 3;

Figure 6 is a perspective view showing one of the rollers and the longitudinally elongated slots for supporting the rollers in adjusted position wherein various sizes of work may be supported by the work support of Figure 3;

Figure 7 is a detailed, vertical sectional view taken substantially along section line 7—7 of Figure 2 showing the details of construction of the mounting means for the rail that supports the work supporting member of Figure 3;

Figure 8 is a perspective view showing the clamping block utilized in the construction of Figure 7;

Figure 9 is a detailed, vertical sectional view taken substantially along section line 9—9 of Figure 2, showing the details of construction of the lathe ways, longitudinally sliding base, transversely sliding carrier, pivotally mounted swing plates, adjustably mounted upstanding tool post and tools mounted on the tool post;

Figure 10 is a bottom plan view of the construction of Figure 9, with the lathe ways omitted;

Figure 11 is a detailed, sectional view taken substantially along section line 11—11 of Figure 9 showing the details of construction and the structural relationship of the base, carrier, swing plate and tool post;

Figure 1:
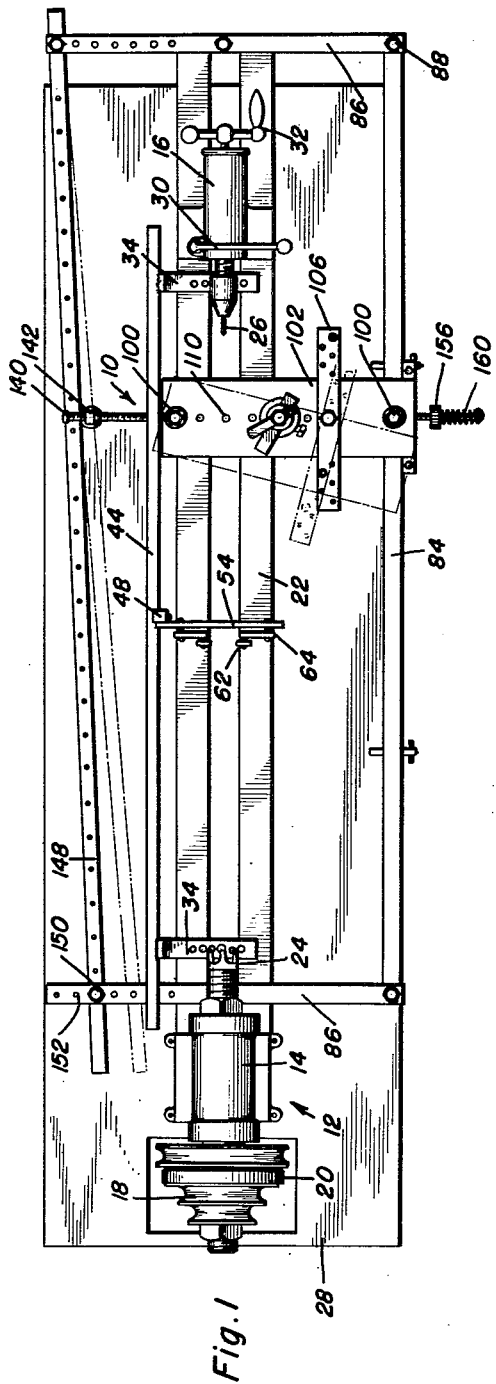
Figure 1 is a top plan view of the lathe attachment of the present invention secured to a conventional wood turning lathe.
Figure 2:
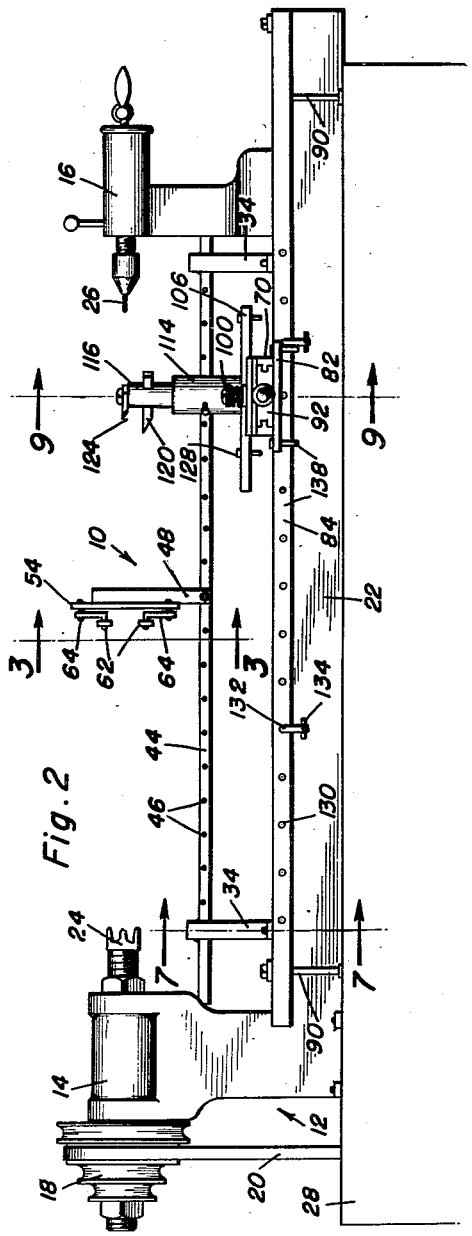
Figure 2 is a side elevational view showing the lathe attachment of the present invention.

Referring now specifically to the drawings, it will be seen that the numeral 10 generally designates the lathe attachment of the present invention for association with a wood lathe generally indicated by the numeral 12 having the usual head pieces 14, tail piece 16, driving pulleys 18, driving belt 20, lathe ways 22, centers 24 and 26, and a supporting bench 28, all of which is conventionally found on wood lathes 12 wherein the tail piece or tail stock 16 is longitudinally adjustable for engaging work pieces of wood of varying lengths. Suitable clamp means 30 is provided for securing the tail stock in adjusted position and adjusting means 32 is provided for moving the tail centering piece 26 longitudinally of the lathe ways 22. The particular construction of the lathe is conventional and forms no part of the present invention, as the invention relates to an attachment for a conventional wood lathe for accurately and easily cutting work on a wood lathe.

Referring now specifically to Figures 1, 2, 5 and 7, it will be seen that a pair of L-shaped brackets 34 having a plurality of apertures 36 in one leg thereof are secured to the lathe ways 22 by a clamp bar 38 positioned between the lathe ways and the clamp bolt 40 screw threaded in a central aperture 42 wherein the clamp bolt 40 is selectively positioned in the apertures 36 for securely clamping the brackets 34 to the lathe ways 22. The other leg of the brackets 34 upstands vertically from the lathe ways 22 and includes an elongated rail 44 having a plurality of longitudinally spaced threaded apertures 46 therein. The apertures 46 adjustably support a bracket 48 having a securing bolt 50 inserted through an aperture in the lower end thereof and threadedly engaging the threaded apertures 46 in the rail 44. The bracket 48 is provided with a recessed portion 52 engaging the edge of the rail 44 wherein the bracket 48 is retained in a rigid upstanding position. A generally rectangular plate 54 having a pair of notches 56 in one edge thereof is attached to the upstanding bracket 48 in adjusted position by a pair of screw threaded members 58 that extend through the bracket 48 and are provided with nuts 60 on the opposite ends thereof. The plate 54 is generally U-shaped with the notches 56 in the bight portion thereof and the two legs of the U-shaped plate 54 form an enlarged opening 60. A plurality of work supporting and engaging rollers 62 are individually rotatable on separate brackets 64 having an elongated slot 66 in each, together with a screw threaded fastening member 68 for adjustably securing the brackets 64 and the rollers 62 within the enlarged opening 60 wherein the work positioned between the centers 24 and 26 will be supported at longitudinally adjusted points between the end portions thereof. By manipulating the screw threaded fasteners 68, the position of the roller 62 may be adjusted, thereby adapting the device for supporting work of various sizes after the rough cuts have been made so that the work is substantially cylindrical.

Referring now specifically to Figures 9, 10 and 11, it will be seen that a base plate 70 of generally inverted channel-shape with inwardly extending ribs 72 on the inner faces of the upstanding portions of the base 70 is slidably supported on the lathe ways 22 wherein a right angle member 74 is secured to the underportion of the base 70 in a recessed portion 75 and in engagement with the forward, inner edge of the lathe ways 22. Another right angular member 76 is adjustably and detachably secured to the undersurface of the base member 70 by the use of screw threaded fasteners 78 positioned in open slots 80. The base member 70 is also provided with a depending portion 82 which is in opposition to the right angle member 76 for slidable engagement with an elongated supporting bar 84 that is supported in spaced relation to the lathe ways 22 by a pair of remote brackets 86 attached to the ends of the bar 84 by screw threaded fasteners 88. Supporting members 90 are positioned under the bar 84 for supporting the bar 84 along its longitudinal length, wherein the base 70 may be moved longitudinally along the lathe ways 22 with the base 70 positioned by the right angle members 74 and 76 and the depending portion 82 for accurately and positively guiding the longitudinal movement of the base 70 in parallel relation to the ways 22.

A carrier 92 in the form of a plate which is substantially the same size as the base 70 is provided with a pair of depending longitudinal projections 94 having grooves 96 therein that are slidably engaging the longitudinal ribs 72 wherein the carrier 92 is longitudinally slidable on the base 70. The remote ends of the carrier plate 92 are provided with vertically extending threaded sockets 98 for receiving screw threaded studs 100 that detachably and pivotally support a swing plate 102. The stud 100 on one end is elongated and provided with a spring 104 for retaining the swing plate 102 in pivotal position. A transverse bar 106 is secured to the upper surface of the swing plate 104 by a screw threaded fastener 108. The swing plate 102 is provided with a plurality of longitudinally spaced screw threaded apertures 110 for receiving the screw threaded stud 112 on the bottom of a tool post 114. The tool post 114 includes an extensible portion 116 that is adjustable vertically and angularly and locked in position by a pair of setscrews 118. The upper end of the tool post is designated by the numeral 116 and is provided with a transverse aperture for receiving a pointed tool 120 and the upper end is provided with a socket for receiving a screw threaded member 122 that detachably mounts a second tool 124 that may be pivoted about the longitudinal axis of the tool post 114. By removing either of the studs 100, the swing plate 102 may be pivoted about the axis of the then remaining stud 100 for cutting concave or convex surfaces on the work with the tools 120 or 124, as desired. The radius of the curvature of the shape is determined by the positioning of the tool post 114 on the swing plate 102 and by the position of the pivot stud 100. The transverse plate 106 is provided with a plurality of spaced apertures 126 for receiving depending pins 128 that will engage the side edge of the carrier 92 thereby limiting the pivotal movement of the swing plate 102 to a predetermined angular position. An aperture 130 is positioned in the tool post 114 for insertion of a suitable cylindrical tool for removing and positioning the tool post 114 on the swing plate 102. The depending flange of the bar 84 is provided with a plurality of longitudinally spaced apertures 130 for receiving the U-shaped stop member 132 having a screw threaded member 134 extending between the free legs thereof and the projection 82 on the base 70 is provided with a plurality of apertures 136 for receiving stop pins 138 wherein the sliding movement of the base 70 and the tool post 114 is limited. An elongated screw threaded member 140 extends outwardly from the carrier 92 on the inner end thereof and adjustably receives a bracket 142 that carries a roller or follower 144 thereon. The bracket 142 is locked in position by a lock nut 146 wherein the position of the follower 144 may be adjusted in relation to the threaded member 144 and the carrier 92. A taper guide rail 148 is mounted on the remote ends of the brackets 86 by fastening members 150 that are positioned in selected apertures 162. It will be seen that the taper guide rail 148 forms a surface that is abutted by the follower 144 wherein the transverse position of the carrier 92 along with the tool post 114 may be regulated. As shown in Figure 1, the taper guide rail 148 may be angularly adjusted by obvious manipulation of the screw fasteners 150 and the selected apertures 152, thereby changing the taper of the work shaped by the lathe 12 and the lathe attachment 10. A lock screw 154 extends through the depending portion 82 of the base 70 for locking the base 70 along the longitudinal length of the lathe ways 22 and the supporting bar 84. A stop member 156 is threadedly engaged on a threaded member 158 projecting from the other end of the carrier 92 wherein the stop member 156 is spring loaded by a compression spring 160 for limiting the movement of the carrier 92 and the tool post 114.

The operation of the device will appear from a careful observation of the structure as the taper rail 148 will control the transverse movement of the carrier 92, swing plate 102, tool post 114 and the tools 120 and 124 mounted thereon, thereby controlling the amount of the material to be cut from the work disposed between the centers 24 and 26 of the wood lathe 12. The work supporting rollers 62 may be utilized at any point along the length of the material or work, thereby rigidly supporting the work for accurate cutting thereof. Further, by pivoting the swing plate 102 at either end thereof, concave or convex surfaces may be cut with the cutters 120 or 124 with the radius of the cut to be determined by the position of the tool post 114 in the selected aperture 110, thereby giving the lathe attachment 10 a wide range of utility.

Figures 12, 13, 14:
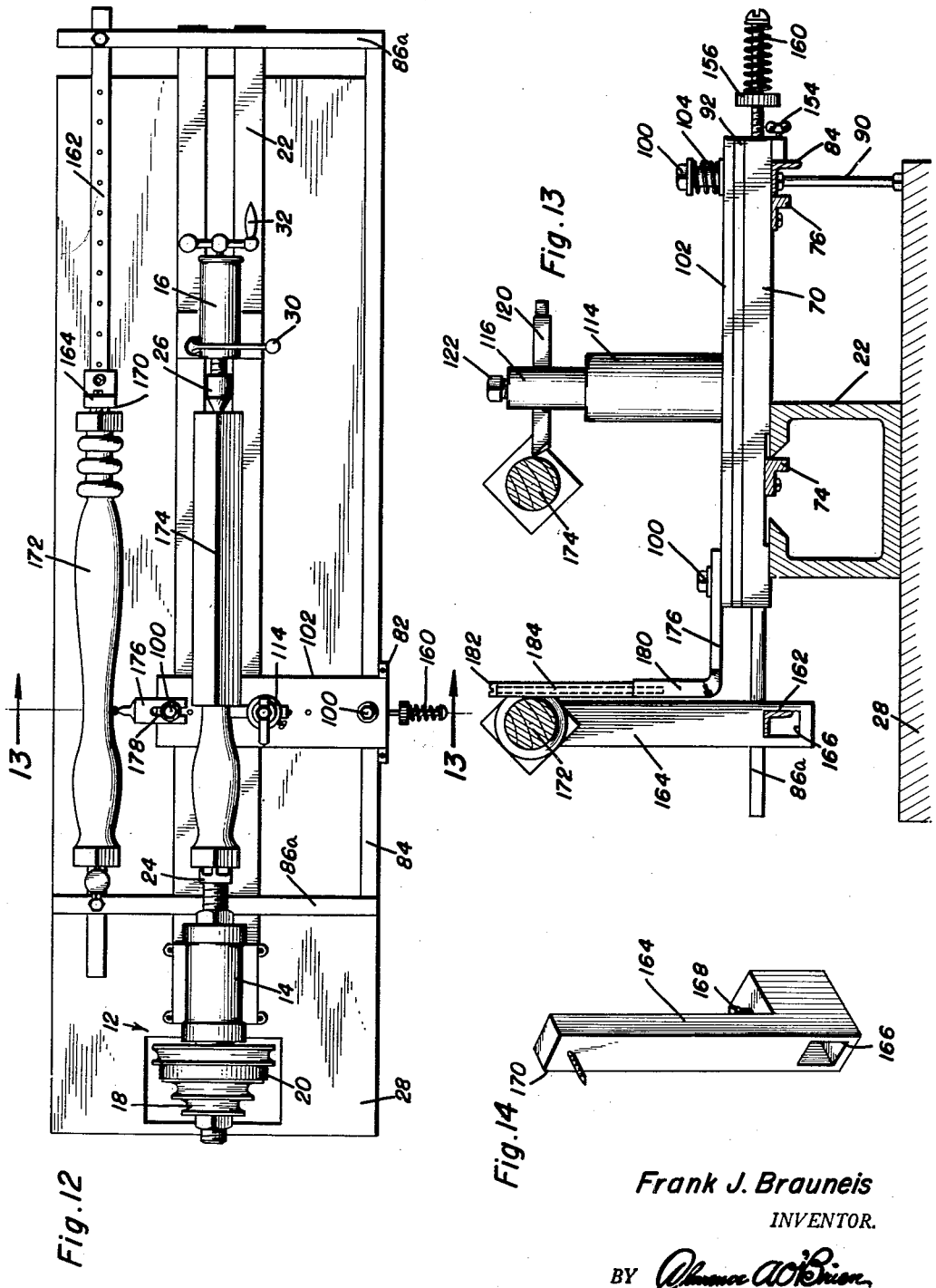
Figure 12 is a top plan view of a modified form of the lathe attachment wherein the tool follows the contour of a template or pattern mounted on the rail normally utilized for supporting the work supporting member.
Figure 13 is a transverse, vertical sectional view taken substantially along section line 13—13 of Figure 12 showing the details of construction thereof.
Figure 14 is a perspective view showing one of the pattern holding members for adjustable mounting on the rail.

Referring now specifically to Figures 12–14 of the drawings, it will be seen that an elongated rail 162 is disposed between the remote ends of end brackets 86a similar to the brackets 86 or other suitable brackets disposed thereon, and a pair of upstanding brackets 164 are slidably positioned on the rail 162 with the lower end thereof having openings 166 for slidably surrounding the rail 162. A setscrew 168 is positioned in the bracket 164 for extending in through the opening 166 for engaging the work rail 162 and locking the brackets 164 in adjusted position thereon. The upper end of the bracket 164 is provided with a pointed member 170 that extends inwardly from the inner edges or inner surfaces of the brackets 164 for engaging a pattern or template 172 wherein the pattern or template 172 is in the shape desired to be utilized in constructing the work 174 that is positioned between the centers 24 and 26. A plate 176 having a slot 178 therein is adjustably mounted on the upper surface of the swing plate 102 under the threaded stud 100. The plate 176 has an upturned end member 180 for receiving an elongated screw threaded member 182 having a head thereon for retaining and rotatably supporting an elongated roller 184 which engages and follows the pattern of the template 172, thereby transmitting the changes in shape of the pattern or template 172 to the transversely moving swing plate 102 and carrier 92, thereby moving the tool post 114 and tool 120 a corresponding amount, wherein the shape of the template or pattern 172 is transferred to the work 174, thereby forming the work 174 into substantially the same shape as the template, or pattern 172. It will be been that the elongated roller 184 provides an abutting follower for various shapes for transmitting the shape to the tool 120.

It will be seen that the lathe attachment of the present invention provides an easily and quickly adjusted device for accurately shaping work in the usual wood lathe and also providing means for reproducing desired shapes one or many times, as desired. Obviously, the various components of the attachment may be constructed of any readily obtainable materials having the necessary strength requirements and accessible for use in conjunction with tools of this nature. Further, the construction of the lathe attachment permits the wood lathe to be utilized in a plurality of different ways wherein accuracy of work is retained in all phases of its operation and a taper may be cut with rail 148 in position and a given shape may be formed with rail 162 in position.

From the foregoing, the construction and operation of the device will be readily understood and further explanation is believed to be unnecessary. However, it will be seen that numerous modifications and changes will readily occur to those skilled in the art, and accordingly, it is not desired to limit the invention to the exact construction shown and described, but all suitable modifications and equivalents may be resorted to which fall within the scope of the appended claims.

What is claimed as new is as follows:

1. An attachment for a lathe having work supporting and rotating centers comprising a base slidably mounted on the lathe ways, a tool carrier slidably mounted on said base, a tool post mounted on said carrier for supporting a tool, a longitudinal bar secured to the lathe ways in spaced parallel relation thereto for supporting one end of said base, a longitudinal guide means mounted in spaced relation to the lathe ways, and follower means on said carrier and engaging said guide means for moving said carrier in transverse relation to the lathe ways thereby moving the tool post and tool in relation to the work positioned over the lathe ways upon longituidnal movement of the tool carrier.

2. The structure as defined in claim 1 together with a work support mounted on the lathe ways for supporting the work at a point between the lathe centers.

3. The structure as defined in claim 1 wherein said guide means is an adjustably mounted rail for adjusting the angular relation between the lathe ways and the rail, and said follower means includes a follower roller for engaging said rail and causing transverse movement of the carrier and tool post as the base and carrier are moved longitudinally of the lathe ways.

4. The structure as defined in claim 1 wherein said guide means is constructed as a pattern for the work, and the follower means includes a follower roller for engaging the pattern thereby guiding the transverse movement of the carrier and tool post as the carrier is moved longitudinally thereby shaping the work positioned in the lathe.

5. The structure as defined in claim 1 wherein a swing plate is pivotally mounted at each end thereof on the carrier for swinging movement of the swing plate about opposite ends of the carrier, said plate having a plurality of apertures for adjustably supporting said tool post wherein the tool post and plate may be swung about selective ends of the carrier for cutting concave and convex surfaces on the work with varying radii.

6. A lathe attachment comprising a base longitudinally slidably mounted on the lathe ways, a carrier plate slidably mounted on said base for transverse movement, a swing plate on said carrier for selective pivotal movement thereon, a tool supporting post on said swing plate, longitudinal guide means mounted in spaced relation to the lathe ways, and follower means connected to said carrier plate and engaging said guide means for causing transverse movement of the carrier plate and tool post in response to the guide means upon longitudinal movement of the base along the lathe ways.

References Cited in the file of this patent

UNITED STATES PATENTS

| Number | Name | Date |
| --- | --- | --- |
| 229,844 | Roy | July 13, 1880 |
| 291,971 | Atwood | Jan. 15, 1884 |
| 785,193 | Brown | Mar. 21, 1905 |
| 839,752 | Guenzler | Dec. 25, 1906 |
| 1,779,085 | Blasi | Oct. 21, 1930 |
| 2,057,573 | Henkel | Oct. 13, 1936 |